Nov. 2, 1943.   A. CLAUD-MANTLE   2,333,467
HOOD CONTROL FOR MOTOR CARS
Filed March 31, 1941   4 Sheets-Sheet 1
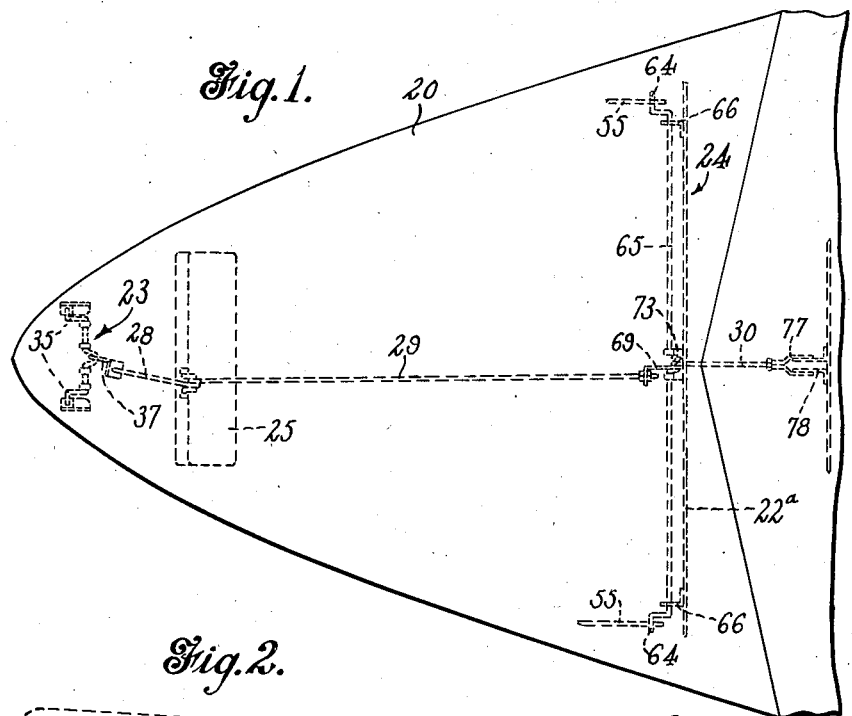
Fig.1.
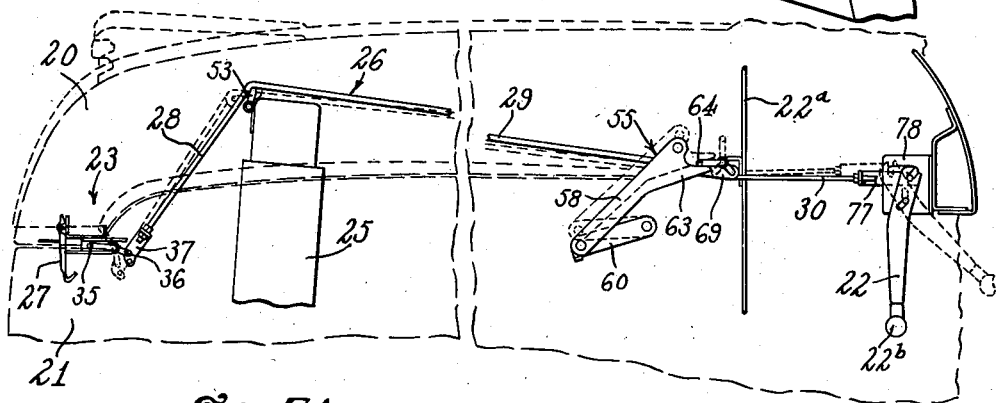
Fig.2.
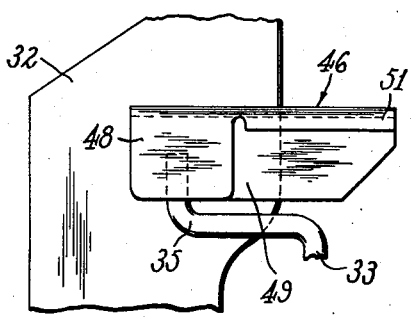
Fig.7ᴬ.
Inventor
Arthur Claud-Mantle
By Rockwell & Bartholow
Attorneys Nov. 2, 1943.  A. CLAUD-MANTLE  2,333,467
HOOD CONTROL FOR MOTOR CARS
Filed March 31, 1941  4 Sheets-Sheet 2
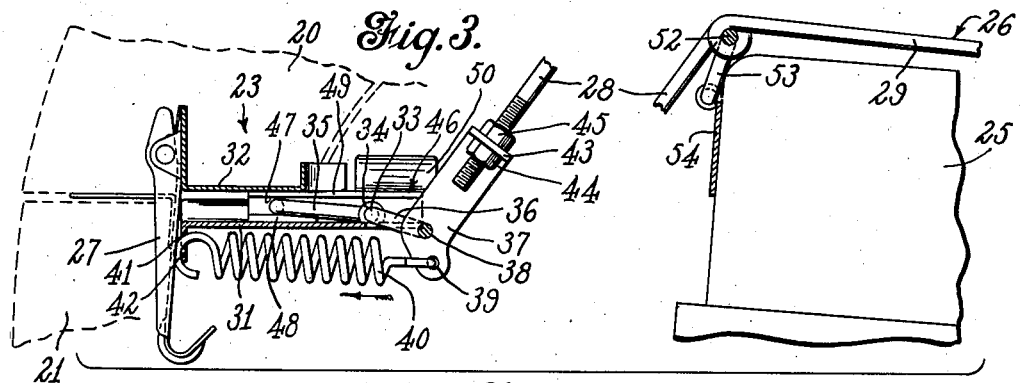
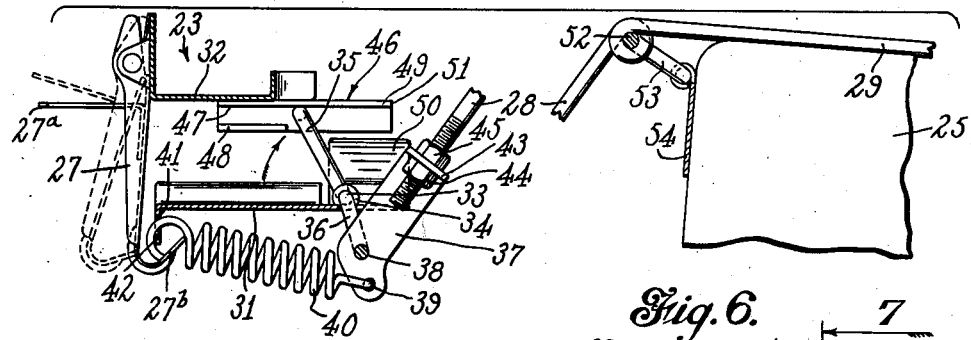
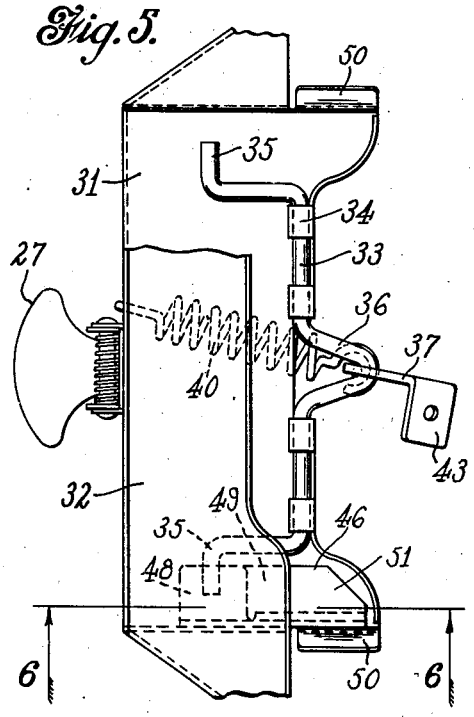
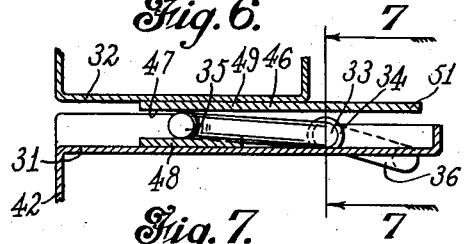
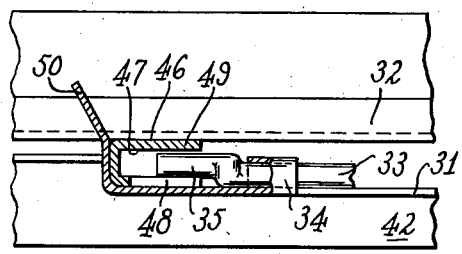
Inventor
Arthur Claud-Mantle
By Rockwell Bartholow
Attorneys Nov. 2, 1943.  A. CLAUD-MANTLE  2,333,467
HOOD CONTROL FOR MOTOR CARS
Filed March 31, 1941  4 Sheets-Sheet 3
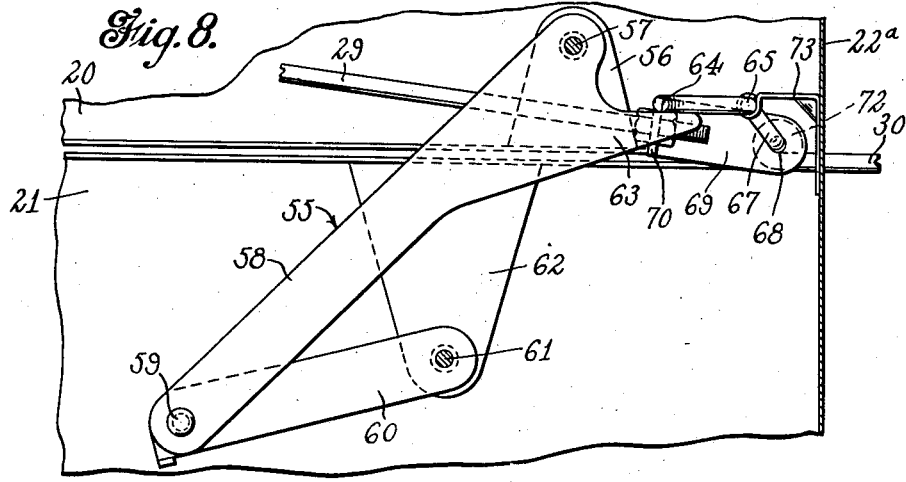
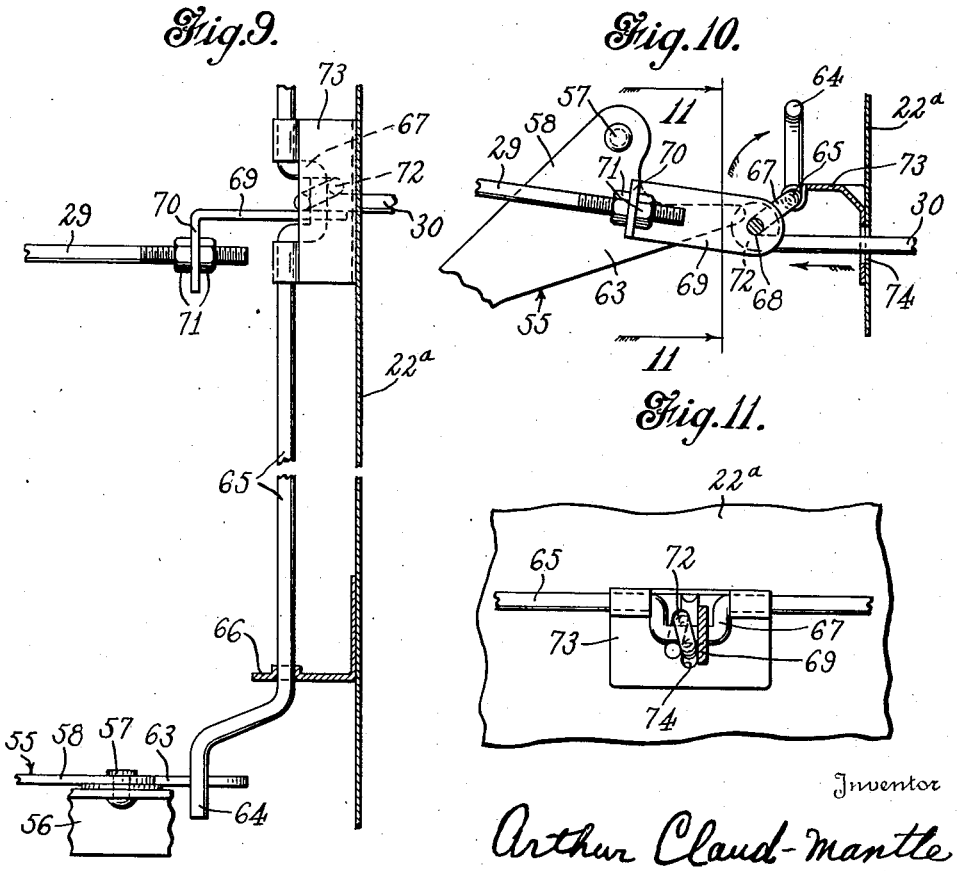

Nov. 2, 1943.  A. CLAUD-MANTLE  2,333,467
HOOD CONTROL FOR MOTOR CARS
Filed March 31, 1941   4 Sheets-Sheet 4
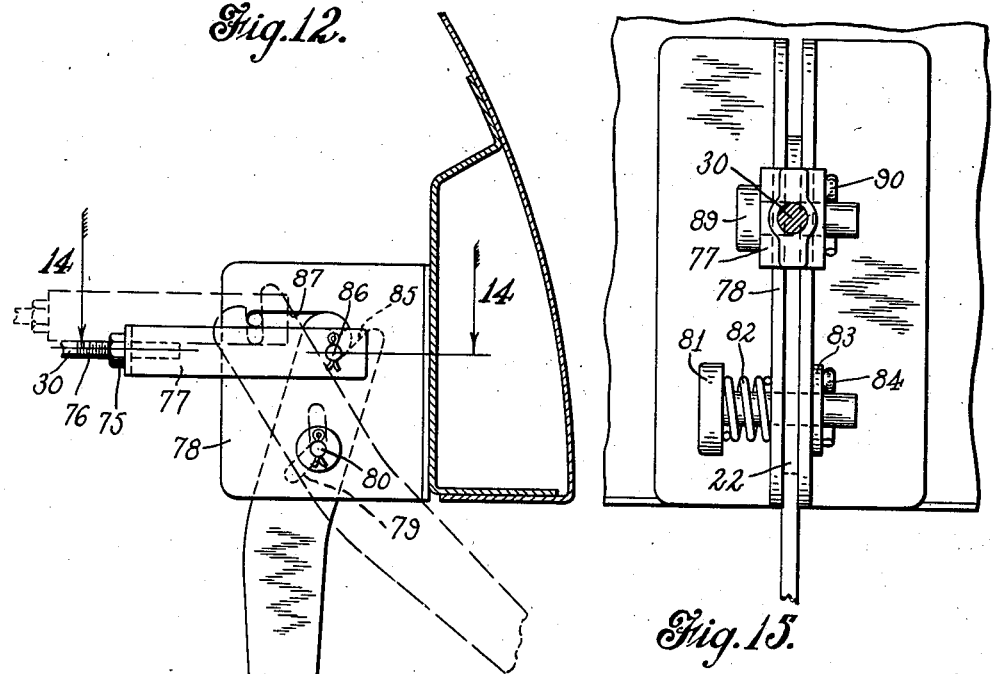
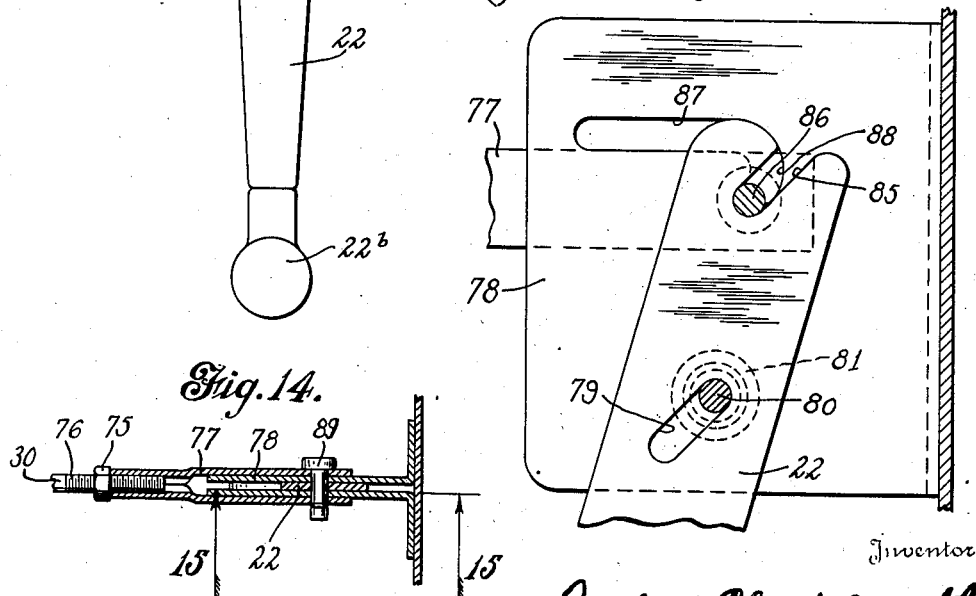
Inventor
Arthur Claud-Mantle
By Rockwell Bartholow
Attorneys Patented Nov. 2, 1943

2,333,467

UNITED STATES PATENT OFFICE 2,333,467

HOOD CONTROL FOR MOTOR CARS

Arthur Claud-Mantle, Trumbull, Conn., assignor to The Bassick Company, Bridgeport, Conn., a corporation of Connecticut Application March 31, 1941, Serial No. 385,981

8 Claims. (Cl. 292—48)

This invention relates to hood controls for motor cars, and it has special reference to latching mechanisms concealed within the hood portion of the car and releasable only from the interior of the car. The invention also has special reference to devices of this nature in which the hood proper, that is to say, the upper movable part of the engine enclosure, is hinged at the rear and adapted to be opened by lifting from the front end of the car, being of the alligator type.

One object of my invention is to provide means for insuring the secure holding and retention of the hood at the rear portion as well as the front portion by the use of a multiple latching or bolting device operable from a single point.

Another object is to provide a simple and satisfactory multiple latching arrangement for this purpose.

Another purpose which I have in view is the provision of improved latching means for latching and holding the hood or lid adjacent its front end.

It is also desired to furnish improved means controlling the lifting of the hood so that upon release of the latching means from the interior of the car the hood will be lifted to a certain extent.

To these and other ends the invention consists in the novel features and combinations of parts to be hereinafter described and claimed.

In the accompanying drawings:

Fig. 1 is a top plan view of the front portion of a motor car showing in dotted lines a hood-latching and controlling device embodying my invention;

Fig. 2 is a side elevation of the latching and controlling mechanism shown in Fig. 1, the latching position being shown in full lines and the unlatched position being indicated in dotted lines;

Fig. 3 is a vertical longitudinal section taken near the center showing the forward portion of the latching mechanism of Fig. 1, the same being in the latched position, this view showing a part of the front portion of the hood and a part of the front portion of the engine enclosure;

Fig. 4 is a view generally similar to Fig. 3, illustrating, however, the position in which the hood is unlatched but only partially open and still under the control of the safety catch;

Fig. 5 is a top plan view, with parts broken away, of some of the mechanism of Fig. 3, the parts being shown in the latched position;

Figs. 6 and 7 are respectively sections on lines 6—6 of Fig. 5 and 7—7 of Fig. 6;

Fig. 7A is a fragmentary view of the bottom of the upper plate;

Fig. 8 shows on a larger scale certain parts illustrated in the right-hand portion of Fig. 2;

Fig. 9 is a top plan view partly in section of certain parts shown in Fig. 8;

Fig. 10 shows in transverse section certain parts illustrated in Fig. 9, the latching rod for the rear portion of the hood being in the unlatched position;

Fig. 11 is a section on line 11—11 of Fig. 10; and

Figs. 12, 13, 14 and 15 are details of the actuating mechanism located within the car, Fig. 12 being a side elevation partly in section, Fig. 13 being a front view partly in section of the actuating lever bracket, the lever being partly broken away, Fig. 14 being a section on line 14—14 of Fig. 12, and Fig. 15 being a section on line 15—15 of Fig. 14.

In the form of my invention selected for illustration, I have shown a motor car provided with an alligator type hood. The hood carries interiorly adjacent the front end thereof, and at opposite sides of the median line, devices forming parts of latches adjacent the respective sides of the hood. Adjacent the rear end of the hood the same carries interiorly members forming parts of latch devices adapted to retain and hold down the hood at opposite sides in locations near the hood-hinging axis. Thus in this preferred form the hood is latched down at four points, two adjacent the front end and two adjacent the rear end. The latch devices operating at these points are all adapted to be released simultaneously by actuation of a device such as a lever mounted within the car at a convenient point near the driver, and for purposes of simultaneous operation a linkage is employed connecting the front latch devices to the rear ones and the rear ones to the actuating lever. Supposing the hood to be in the closed position, the actuation of the actuating lever causes the latch devices to be released. A spring, coming into action at this time and cooperating with the forward portion of the hood, causes the front portion of the hood to be lifted to a certain extent, although it is still under the control of the usual safety catch; and upon manipulation of the safety catch by the attendant at the service station the hood can be lifted to the full extent.

In the drawings, the hood is shown at 20, the same being hinged at the rear and cooperating with the usual fixed lower member 21 of the engine enclosure. The actuating lever within the car is shown at 22, this being at the rear of the partition 22ᵃ between the engine compartment and the car interior. The latch mechanism at the front part of the hood is indicated generally at 23, while the latch mechanism at the rear portion of the hood is indicated generally at 24. The radiator of the car is indicated at 25, and in this particular case the radiator supports a portion of the operating linkage, this operating linkage being generally indicated at 26. The safety catch or dog associated with the front latching mechanism is indicated at 27. The operating linkage 26 consists principally of three sections, namely, a front section 28, a middle section 29, and a rear section 30, the latter section being connected to the actuating lever 22.

Referring now to the detail structure of the forward or front end latching mechanism 23, it will be noted that I mount upon the fixed part of the engine enclosure in any appropriate manner a transverse plate 31, which is termed the lower plate, and which cooperates with a transverse upper plate 32 carried by the hood adjacent the front end of the latter. Mounted upon the upper surface of lower plate 31 is a rocking rod 33 having suitable bearings 34. At the ends of the rod the same is bent to provide integral crank portions 35 which are adapted to cooperate with certain parts carried by or forming parts of the upper plate 32 in such a manner as to latch and hold the hood. At its intermediate portion and in a region near the rear edge of plate 31, rod 33 is bent, as indicated at 36, to provide a crank portion by means of which the rod can be rocked in its bearings, and in this particular case rocking is accomplished by means of a plate 37 having a hole 38 by which it engages the crank at the outer part of the latter. Below the hole 38 the plate 37 is provided with a hole 39, and in the hole 39 is engaged the rear end of a coiled spring 40, the front end of which spring is hooked into an opening 41 in a flange 42 depending from plate 31 along its forward edge. In the latching position the plate 37 extends rearwardly and upwardly, and at its upper end it is provided with a flange 43 by means of which it is connected to a section 28 of the operating linkage, this section comprising a rod having a threaded lower end portion engaged by nuts 44 and 45 located respectively below and above flange 43, and cooperating with said flange to secure section or rod 28 rigidly to the plate 37.

In order to cooperate with the crank-like extremities 35 of the rocking rod, the upper plate 32 is provided with parts or members presenting longitudinal grooves or channels adapted to be engaged and disengaged by said extremities. It is preferred to provide the upper plate at its lower surface with transverse members presenting grooves adapted to be engaged by the rod extremities. In the form shown these transverse members are of sheet metal, as indicated at 46, these members being bent to provide grooves 47, and said members being suitably attached to the upper plate as by welding.

As shown in Fig. 4, the grooves 47 are located at the forward parts of the members 46, said parts 46 having in this location a lower flange 48 as well as an upper flange 49, but toward the rear the member 46 is cut away and has only an upper flange. This provides on members 46 portions in which the rod extremities are free to swing before entering the spaces between the lower flanges 48 and the upper flanges 49.

Upon being lowered into cooperation with the lower plate, the upper plate 32 is adapted to be guided and centered by means in association with the lower plate, so that the two plates will have the proper relative locations, and for this purpose I may provide the lower plate adjacent the respective sides of the hood with upwardly and outwardly inclined centering lips 50 adapted to engage portions of the upper plate, these upper plate portions, in this particular case being the rear portions of the members 46, which rear portions project rearwardly beyond the upper plate in the manner shown at the lower part of Fig. 5, and one of these rearwardly projecting portions being indicated at 51 in Fig. 5.

From the plate 37 rod or section 28 extends in an upward and rearward direction to a point adjacent the top of the radiator 25, and at that point it is pivoted to the intermediate crank-shaped part 52 of a swinging member 53 pivoted on the front upper portion of the radiator structure by a bracket 54. The linkage section or rod 29 is also pivoted to the part 52. Preferably the rods 28 and 29 have end portions arranged side by side and bent around part 52.

Rod 29 extends rearwardly into cooperation with the rear latching mechanism 24, as shown in Figs. 1 and 2, and the particular rear latching mechanism used in this case is illustrated in detail in Figs. 8 to 11, inclusive. In this particular case the rear latching mechanism cooperates with hood props of the usual kind associated with the rear portion of the hood at the sides thereof for the purpose of holding the hood in the raised position when that is desired. However, this is merely by way of example, for the rear latch mechanism may be used in some cases entirely independently of any hood props which may be used. In the form illustrated each hood prop, which is generally indicated at 55, comprises toggle elements, and a latch mechanism is arranged to coopearte with a projection on a toggle element of each prop in order to hold the hood down in the closed position. The latching mechanism comprises a rocking rod of the same general nature as the rocking rod 33, previously described. In this particular case the hood is provided at each side with a bracket member 56 to which is pivoted at 57 a toggle element, 58, which toggle element in turn is pivoted at 59 to a second toggle element 60, the latter being pivoted at 61 to a bracket 62 carried by the fixed part of the engine enclosure. These toggles, with their brackets, constitute the prop, and in the closed position of the hood the prop has a folded position shown in Fig. 8. In this position a projection 63 extending rearwardly from toggle element 58 is adapted to be engaged from above by the crank-like extremity 64 of a rocking rod 65, which in this case forms a part of the latching mechanism 24. The rod 65 has two such crank-like extremities, one on each side of the hood, to cooperate with the respective prop. The rocking rod is preferably mounted on the partition 22ᵃ for rocking movement in suitable brackets 66.

At its middle portion rocking rod 65 has an integral bent crank portion 67 by means of which the same can be actuated, and this bent portion engages a hole 68 in the rear portion of a plate 69 connected to the rear portion of rod 29 by means of a flange 70 on said plate 69, and nuts 71 engaging the rod at opposite faces of the flange. Alongside the plate 69, and also in engagement with the crank portion 68, is an eye 72 formed at the forward end of the rear section or rod 30, so that from lever 22 the rocking rod 65 can be rocked in its bearings into latching or unlatching relation to the latching member 63. The intermediate part of the rocking rod is supported from the partition member 22ª by a suitable bracket 73. In the latching position the crank extremities of the rocking rod have an approximately horizontal position, as shown in Fig. 8, and in the released position these crank portions are swung upwardly to a position such as shown in Fig. 10.

The rear end of the linkage section or rod 30 is located back of the partition 22ª, said rod passing through a clearance opening 74 in said partition, and the rear end of said rod is connected, by means including a nut 75 engaging threads 76 on the rod, to the forward end of a clip member 77 of bifurcated form having legs disposed at opposite faces of a bracket 78. This bracket is suitably supported adjacent the instrument board of the car and serves as a mounting for the actuating lever 22. The bracket 78 is of bifurcated form having side walls in parallelism, and the lever 22 is pivoted to the bracket in the space between these walls. As shown in Fig. 12 the lever has a depending relation to the bracket, and the lever is provided at the lower end with a manipulating handle 22ᵇ.

At a point near the upper end of the lever and between the walls of brackets 78 the lever is provided with an inclined slot 79 through which passes a pin 80 serving as a pivotal mounting for the lever. At one side of the bracket the pin 80 has a head 81, and between this head and one wall of the bracket is a vibration damping spring 82. At the opposite side of the bracket the pin is held in place by a washer 83 and a cotter pin 84.

At the upper end of the lever 22 its body is provided with a relatively deep inclined notch 85 adapted to engage a cross pin 86 carried by the rear end portion of the clip 77 and passing through the walls of the bracket. The bracket walls are provided with irregular elongated slots 87 in which the cross pin 86 is adapted to travel in the manner hereinafter described. The slots 87 are for the most part horizontal, but at their rear ends they are provided with depending curved portions 88 in which, when the lever is in the latching position, the pin 86 is received. The pin 86 is held in place by a head 89 at one side of the bracket and a cotter pin 90 at the opposite side.

When the latching mechanism has the position shown in full lines in Fig. 2, the hood is locked down at four points, as previously explained. The forward latch mechanism then has the position shown in Fig. 3, and the rear latch mechanism has the position shown in Figs. 8 and 9. The actuating lever 22 has the position shown in full lines in Fig. 12. When the car arrives at the filling station for service, the driver releases the hood by actuation of lever 22, which for this purpose has its lower end pulled in a rearward direction, as indicated by the dotted lines in Fig. 12. The lever swings on the pivot 80, and as the upper end of the lever moves in a forward direction, the cross pin 86 of clip 77 is cammed upwardly and forwardly in slots 87 by the notched upper end of the lever, the lever being capable of some upward movement to permit this by virtue of the provision of slot 79. As the pin 86 is fixed to the clip 77, the clip is thrust forwardly (with some incidental upward movement), and the forward thrust causes the front end of rod 30 to rock rocking rod 65 to the releasing position shown in Fig. 10, thus releasing the rear hood catches or latches, which in this case are associated with props 55. At the same time that this action is taking place, the plate 69 is being shifted forwardly from the position shown in Fig. 8 to that shown in Fig. 10, and this causes rod 29 to be thrust forwardly to the position shown in Fig. 4, and when the rod 29 is in this position the rod 28 has been thrust forwardly and downwardly to the position shown in Fig. 4, which brings about the release of the forward hood catches through the downward movement of the plate 37 and the rocking movement of the rocking rod 33 caused by such downward movement.

The forward hood latch being in the position shown in Fig. 3, initially, and each rod extremity 35 being part way along the length of the grooved or channeled portion transversely arranged with respect to the upper plate and carried thereby, the downward and forward push imparted to plate 37 causes the intermediate crank portion of rod 33 to be pushed down, and each extremity 35 swings upwardly and rearwardly, maintaining engagement with the upper flange 49 and lifting the upper plate, with the hood and other parts carried with it, to the position shown in Fig. 4, where the rod extremity is slightly to the rear of flange 48. Therefore, the hood is in a position to be lifted farther, but first the safety catch 27 will have to be released by engaging its forwardly projecting pad 27ª so as to swing its lower hook 27ᵇ out of the path of flange 42 of the lower plate to the position indicated in dotted lines in Fig. 4.

It is important, however, to consider the function of the coil spring 40. In the position of Fig. 3 this spring is under tension, and its rear end, acting on the lower end of plate 37, urges the latching extremities of rod 33 in a clockwise direction, as indicated by the arrow in Fig. 4. In other words, this spring urges the latching members 35 toward a released position. This tendency is overcome, however, by the securement of lever 22 and its connected linkage against movement by the provisions previously described. As a matter of fact, the linkage is directly and effectively dogged in the latching position because the cross pin 86, fixedly carried by the linkage, is held in the rear parts of slots 87 and cannot be moved in a forward direction except at such time as lever 22 is operated.

Reverting to the spring 40, it will be observed that this spring not only has a latch-releasing tendency, but also a tendency to lift the hood, because of the fact that in the latched position the rod extremities 35 are located under the upper plate structure in such a relation that upon raising the rod extremities from the lower plate, the upper plate and hood are necessarily lifted.

When it is desired to release the hood the lever 22 is manipulated in the manner previously described, giving the linkage a forward thrust which causes release of the latch devices. The hood is moved upwardly by the thrust on the linkage and by the spring 40, and is held in a slightly raised position by the spring. The props 55 are partially unfolded. The safety catch is then operated to permit the hood to be fully raised, at which time the props will act in the usual manner. Upon closing the hood the front end is grasped and pulled down and the safety catch, which has the usual spring, engages the lower plate and is swung out of the way, and the upper plate comes down into engagement with the rod extremities 35, and under manual pressure on the hood acts to force them down. Shortly after reaching the position shown in Fig. 4, the rod extremities pass into the rear ends of the grooves or channels, and finally the latching mechanism at the front of the hood comes to the position shown in Fig. 3 as a result of downward pressure on the hood, which causes tensioning of the spring 40 and upward movement of rod 28. To complete the latching of the hood the linkage is pulled rearwardly by lever 22, and this rearward pull causes the rear latch devices to be moved to the latching position, and also causes the dogging of the linkage in its rearward position, as previously explained.

By my invention the hood can be effectively latched and held at a plurality of points, preferably four, so that when closed it will be maintained under effective control. Yet notwithstanding the use of multiple latching devices, the structure is simple, relatively inexpensive, and effective in operation. Release of the plural latching devices can be readily and conveniently brought about by the driver from the driver's seat. Access to the parts within the hood, except by authorized persons, is prevented. In a simple manner the hood is raised to a slight degree as soon as the latching mechanism is released by the car driver, and thus the attendant at the filling station can have ready access to the safety catch and can complete the raising of the hood. The mechanism for latching and partially lifting the upper plate and the hood attached thereto is inexpensive and has relatively few parts, and operates in a very effective manner, the spring-pressed extremities of the rocking rod adjacent the forward end of the hood having a hood-raising as well as a hood-releasing action upon upward swinging movement of said extremities with relation to the plate on which they are mounted, which swinging movement causes the hood plate to be cammed upwardly. On the downward movement of the hood, the rod extremities, once they enter their grooves, are in holding relation to the hood, and by forcing the hood down the movable latching partions or catches can be cammed to the position in which they are to be locked or dogged by actuation of the hand lever.

While I have shown herein but one embodiment of my invention, it will be understood that it is capable of many different embodiments, and that various modifications and changes in the organization of parts and in the details can be made without departing from the principles of the invention or the scope of the claims.

What I claim is:

1. In a latch mechanism for releasably securing a rearwardly pivoted hood, opening at the front, to a fixed part of the engine enclosure, a plurality of latch devices for latching together the fixed and movable parts, two of said devices being located toward the front end of the hood at opposite sides thereof and two being located adjacent the rear end of the hood at opposite sides thereof, and means including a linkage and an operating lever whereby all of said devices are operable from the interior of the car, the forward latching devices including a common operating member and the rearward latching devices also including a common operating member.

2. In a latch mechanism for releasably securing a rearwardly pivoted hood, opening at the front, to a fixed part of the engine enclosure, a plurality of latch devices for latching together the fixed and movable parts, two of said devices being located toward the front end of the hood at opposite sides thereof and two being located adjacent the rear end of the hood at opposite sides thereof, and means including a linkage and an operating lever whereby all of said devices are operable from the interior of the car, the forward latching devices including a common operating member and the rearward latching devices also including a common operating member, said common operating members being constituted by rocking rods arranged transversely of the hood having crank-like extremities.

3. In a latch mechanism for releasably securing a rearwardly pivoted hood, opening at the front, to a fixed part of the engine enclosure, a plurality of latch devices for latching together the fixed and movable parts, two of said devices being located toward the front end of the hood at opposite sides thereof and two being located adjacent the rear end of the hood at opposite sides thereof, and means including a linkage and an operating lever whereby all of said devices are operable from the interior of the car, the forward latching devices including a common operating member and the rearward latching devices also including a common operating member, said common operating members being constituted by rocking rods arranged transversely of the hood having crank-like extremities, the rocking rod located toward the front end of the hood being carried by a fixed lower plate and the rocking rod located adjacent the rear end of the hood being mounted on a fixed part adjacent the rear of the engine compartment.

4. In a hood control device for motor cars, a front latching mechanism for a rearwardly pivoted hood comprising a fixed lower plate, a liftable upper plate, and means for interlatching said plates, a rear latching mechanism for retaining and holding down the hood adjacent the rear end thereof, and a common means operable only from the car interior for releasing said mechanisms.

5. In a hood control device for motor cars, a latching mechanism for the forward part of a rearwardly pivoted hood opening at the front, comprising a fixed lower plate, a liftable upper plate, and interlatching mechanism for said plates, a latching mechanism for the rear end portion of the hood, a common operating linkage for said latching mechanisms, operating means for said linkage to move the same so as to latch the hood, and means releasable only by said operating means for dogging the linkage in a position in which the latching mechanisms are held against release.

6. In a hood control device for motor cars, a latching mechanism for the forward part of a rearwardly pivoted hood opening at the front, comprising a fixed lower plate, a liftable upper plate, and interlatching mechanism for said plates, a latching mechanism for the rear end portion of the hood, a common operating linkage for said latching mechanisms, operating means for said linkage, and means releasable only by said operating means for dogging the linkage in a position in which the latching mechanisms are held against release, said linkage-operating means comprising a lever, and said last-named means comprising a dogging member which is moved out of dogging position by actuation of said lever.

7. In a latch mechanism for releasably securing a rearwardly pivoted lid-type hood, opening at the front, to the lower fixed part of an engine enclosure, a plurality of latching devices for latching together the fixed and movable parts, two of said devices being located toward the front end of the hood at opposite sides thereof and two being located adjacent the rear end of the hood at opposite sides thereof, the forward and rearward latching devices each including a common rocking rod arranged transversely of the hood and having crank-like latching extremities, the crank-like extremities of the forward rocking rod being engageable with parts carried by the hood at its under front portion and the crank-like extremities of the other rod being engageable with parts attached to the hood adjacent its pivoted end, a linkage disposed in a generally forward and rearward direction beneath the hood and connected to said rods so that by rearward pull on the linkage the hood is latched at the front and at the rear, and a lever located within the interior of the car for operating said linkage.

8. In a latch mechanism for releasably securing a rearwardly pivoted lid-type hood, opening at the front, to the fixed lower part of an engine enclosure, a fixed lower plate carried by the fixed part of the engine enclosure at its front portion, a liftable upper plate carried by the hood near its front end, means comprising a rocking rod mounted on the fixed lower plate for interlatching said plates, a rear latching mechanism for retaining and holding down the hood adjacent the rear end thereof comprising a transversely arranged rocking rod mounted on the fixed part of the engine enclosure, and a common operating linkage for said rods operable by pull from the car interior for latching the hood at the front and rear.

ARTHUR CLAUD-MANTLE.